United States Patent
Palanisamy Chinnathambi et al.

(10) Patent No.: US 9,330,703 B2
(45) Date of Patent: May 3, 2016

(54) POLISHING COMPOSITION FOR NICKEL-PHOSPHOROUS MEMORY DISKS

(75) Inventors: Selvaraj Palanisamy Chinnathambi, Taman Jurong (SG); Haresh Siriwardane, Woolands (SG)

(73) Assignee: Cabot Microelectronics Corporation, Aurora, IL (US)

( * ) Notice: Subject to any disclaimer, the term of this patent is extended or adjusted under 35 U.S.C. 154(b) by 737 days.

(21) Appl. No.: 12/455,631

(22) Filed: Jun. 4, 2009

(65) Prior Publication Data

US 2010/0308016 A1    Dec. 9, 2010

(51) Int. Cl.
| | |
|---|---|
| *G11B 5/84* | (2006.01) |
| *C23F 1/00* | (2006.01) |
| *C09G 1/02* | (2006.01) |
| *C09K 3/14* | (2006.01) |
| *C23F 1/14* | (2006.01) |
| *G11B 23/50* | (2006.01) |

(52) U.S. Cl.
CPC ............... *G11B 5/8404* (2013.01); *C09G 1/02* (2013.01); *C09K 3/1409* (2013.01); *C09K 3/1463* (2013.01); *C23F 1/14* (2013.01); *G11B 23/505* (2013.01)

(58) Field of Classification Search
USPC ........ 438/692, 693, 691, 690; 216/83, 88, 89, 216/22; 428/846, 846.1, 846.6, 846.7
See application file for complete search history.

(56) References Cited

U.S. PATENT DOCUMENTS

| | | | | |
|---|---|---|---|---|
| 6,471,884 | B1 * | 10/2002 | Fang et al. ...................... | 216/89 |
| 2005/0045852 | A1 * | 3/2005 | Ameen et al. ................. | 252/79.1 |
| 2006/0096496 | A1 * | 5/2006 | Sun et al. .......................... | 106/3 |
| 2007/0027206 | A1 * | 2/2007 | Ina et al. ........................ | 514/425 |

OTHER PUBLICATIONS

Steigerwald et al., Chemical Mechanical Planarization of Microelectronic Materials, Wiley-VCH (1997), chapter 3.*

* cited by examiner

*Primary Examiner* — Anita Alanko

(74) *Attorney, Agent, or Firm* — Thomas Omholt; Arlene Hornilla

(57) ABSTRACT

The invention provides a chemical-mechanical polishing composition comprising alpha alumina, fumed alumina, silica, an oxidizing agent that oxidizes nickel-phosphorous, a complexing agent, and water. The invention also provides a method of chemically-mechanically polishing a substrate comprising contacting a substrate with a polishing pad and the chemical-mechanical polishing composition, moving the polishing pad and the polishing composition relative to the substrate, and abrading at least a portion of the substrate to polish the substrate.

8 Claims, No Drawings

POLISHING COMPOSITION FOR NICKEL-PHOSPHOROUS MEMORY DISKS

BACKGROUND OF THE INVENTION

The demand for increased storage capacity in memory or rigid disks and the trend towards miniaturization of memory or rigid disks (e.g., due to the requirement for smaller hard drives in computer equipment) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

As the demand for greater storage capacity has increased, so has the need for improved processes for the polishing of such memory or rigid disks. The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material. The planarity of the memory or rigid disks must be improved, as the distance between the recording head of a disk drive and the surface of the memory or rigid disk has decreased with improvements in recording density that demand a lower flying height of the magnetic head with respect to the memory or rigid disk. In order to permit a lower flying height of the magnetic head, improvements to the surface finish of the memory or rigid disk are required.

Surface characteristics of memory or rigid disks affecting the flying height of the magnetic head include waviness and microwaviness. Waviness or warp is a gross deviation from flatness over the entire disk surface. Waviness is generally due to the fact that the disk is readily susceptible to warping as a result of its very thin, annular shape, and to various internal stresses introduced during formation of the disk. An intermediate form of surface deviation, herein referred to as microwaviness, may exist. As used herein, microwaviness is a waviness of a disk surface for a range of wavelengths that are on the order of the length of the transducing head. Using current head technology, these wavelengths are approximately in the range of 10 to 5000 microns. For low flying head heights, microwaviness can create an airbearing resonance, thereby causing excessive head to disk spacing modulation. The spacing modulation resulting from microwaviness can cause poor overwriting of data on the disk surface, and in some cases can even cause collision of the head with the disk surface with resulting damage to the disk surface and/or the recording head.

During the polishing of a memory or rigid disk, typically the edges of the disk receive a higher pressure from the polishing tool than the remaining surface area of the disk. Typically, polishing is performed using a combination of an abrasive, a polishing pad, and a liquid carrier, in which the abrasive may be suspended in the liquid carrier, or may be affixed to the surface of the pad. As the polishing process mainly consists of mechanical abrasion of the disk by the abrasive and/or pad, in conjunction with the action of chemicals that may be present, and the rate of abrasion is at least in part a function of pressure applied, the edges of the disk experience a higher rate of abrasion than the rest of the disk. This leads to the formation of a curved, or rounded, contour at the edges of the disk, known in the art as edge roll-off, rub-off, or dub-off. Such rounded areas on a disk are unsuitable for recording. Thus, if the amount of roll-off can be reduced, the recording capacity for a disk can be increased.

As the polishing rate (i.e., removal rate) of the memory or rigid disk is increased, edge roll-off typically decreases, however the microwaviness of the disk typically increases. Thus, there remains a need in the art for polishing compositions and methods for planarizing or polishing memory or rigid disks which minimize microwaviness and edge roll-off, without sacrificing the removal rate of the memory or rigid disk.

BRIEF SUMMARY OF THE INVENTION

The invention provides a chemical-mechanical polishing composition comprising (a) fumed alumina particles, (b) alpha alumina particles, (c) substantially spherical, non-aggregated silica particles, (d) hydrogen peroxide, (e) an iminocarboxylic acid, and, (f) water.

The invention also provides a chemical-mechanical polishing composition comprising (a) fumed alumina particles, (b) alpha alumina particles, (c) substantially spherical, non-aggregated silica particles, (d) an oxidizing agent comprising hydrogen peroxide, potassium hydrogen peroxymonosulfate sulfate (which is commercially available under the trade name of OXONE® from DuPont), and sodium persulfate, (e) a complexing agent, and, (f) water.

The invention further provides a method of chemically-mechanically polishing a substrate comprising (i) contacting a substrate with a polishing pad and one of the above chemical-mechanical polishing compositions, (ii) moving the polishing pad relative to the substrate with the chemical-mechanical polishing composition therebetween, and (iii) abrading at least a portion of the substrate to polish the substrate.

DETAILED DESCRIPTION OF THE INVENTION

The invention provides a chemical-mechanical polishing composition comprising, consisting essentially of, or consisting of (a) fumed alumina particles, (b) alpha alumina particles, (c) substantially spherical, non-aggregated silica particles, (d) hydrogen peroxide, (e) an iminocarboxylic acid, and, (f) water.

The invention also provides a chemical-mechanical polishing composition comprising, consisting essentially of, or consisting of (a) fumed alumina particles, (b) alpha alumina particles, (c) substantially spherical, non-aggregated silica particles, (d) an oxidizing agent comprising hydrogen peroxide, OXONE®, and sodium persulfate, (e) a complexing agent, and, (f) water.

The polishing composition comprises a mixture of fumed alumina particles, alpha alumina particles, and substantially spherical, non-aggregated silica particles. Fumed metal oxides, e.g., fumed alumina and fumed silica, can be prepared from any suitable volatile or nonvolatile precursor. Fumed metal oxides can be produced from volatile precursors by hydrolysis and/or oxidation of the precursors (e.g., metal chloride) in a high temperature flame ($H_2$/air or $H_2$/$CH_4$/air) to produce the metal oxide of interest. Fumed metal oxides can be prepared from nonvolatile precursors by dissolving or dispersing the precursor in a suitable solvent such as water, alcohol, or acid-based solvent. The solution containing the precursor can be sprayed into a high temperature flame using a droplet generator, and the metal oxide aggregate then can be collected. Typical droplet generators include bi-fluid atomizers, high pressure spray nozzles, and ultrasonic atomizers.

Fumed alumina is an amorphous form of aluminum oxide, whereas alpha alumina refers to a crystalline polymorph of aluminum oxide formed at high temperatures above 1400° C. Alpha alumina typically refers to alumina comprising about 50 wt. % or more of the alpha polymorph. As used herein, the amount of alpha alumina in the polishing composition refers to the total weight of crystalline alumina present therein, wherein about 50 wt. % or more of the crystalline alumina comprises the alpha polymorph. Fumed alumina is typically less abrasive than alpha alumina. Both forms of alumina are well known in the art and available commercially in a wide range of particle sizes and surface areas.

The substantially spherical, non-aggregated silica particles include wet-process type silica particles (e.g., colloidal, condensation-polymerized or precipitated silica particles). Substantially spherical, non-aggregated silica particles typically are prepared by condensing $Si(OH)_4$ to form colloidal particles, where colloidal is defined as having an average particle size between about 1 nm and about 1000 nm. Such abrasive particles can be prepared in accordance with U.S. Pat. No. 5,230,833 or can be obtained as any of various commercially available products, such as the Akzo-Nobel Bindzil 50/80 product and the Nalco 1050, 1060, 2327, and 2329 products, as well as other similar products available from DuPont, Bayer, Applied Research, Nissan Chemical, Fuso, and Clariant.

As is well known in the art, abrasive particles comprise, at the lowest level of structure, primary particles. Primary particles are formed by covalent bonds between atoms comprising the particles and are stable to all but the harshest conditions. At the next level of structure, primary particles are associated into secondary particles, generally referred to as aggregates. Aggregate particles comprise primary particles and are bonded together by covalent bonds and electrostatic interactions, and typically are resistant to degradation by, e.g., mechanical energy inputs such as high-shear mixing. At the next level of structure, aggregates are more loosely associated into agglomerates. Typically, agglomerates can be disassociated into the constituent aggregates via mechanical energy inputs. Depending on the particular composition and method of preparation, primary particles and secondary particles (e.g., aggregates) can have shapes ranging from spherical to elliptical, and some aggregates can have extended, chain-like structures. For example, pyrogenic, or fumed, metal oxides typically exist in the form of aggregates having a chain-like structure. Fumed aluminas, for example, have an aggregate structure in which approximately spherical primary particles are associated into chain-like aggregates of primary particles that resemble a "bunch of grapes." Both primary abrasive particles and aggregated primary particles (e.g., secondary particles) can be characterized as having an average particle size. In this regard, particle size refers to the diameter of the smallest sphere that encloses the particle. For aggregated particles, the particle size is with respect to the aggregates as opposed to the primary particles unless explicitly stated.

The fumed alumina particles can have any suitable average particle size (i.e., average particle diameter). The fumed alumina particles can have an average particle size of about 30 nm or more, e.g., about 40 nm or more, about 50 nm or more, about 60 nm or more, about 70 nm or more, about 80 nm or more, about 90 nm or more, or about 100 nm or more. Alternatively, or in addition, the fumed alumina can have an average particle size of about 250 nm or less, e.g., about 230 nm or less, 210 nm or less, 190 nm or less, 170 nm or less, or 150 nm or less. Thus, the fumed alumina can have an average particle size bounded by any two of the above endpoints. For example, the fumed alumina can have an average particle size of about 30 nm to about 250 nm, about 80 nm to about 250 nm, about 80 nm to about 210 nm, or about 100 nm to about 150 nm.

The alpha alumina particles can have any suitable average particle size (i.e., average particle diameter). The alpha alumina can have an average particle size of about 100 nm or more, e.g., about 150 nm or more, about 200 nm or more, about 250 nm or more, about 300 nm or more, about 350 nm or more, about 400 nm or more, or about 450 nm or more. Alternatively, or in addition, the alpha alumina can have an average particle size of about 800 nm or less, e.g., about 750 nm or less, 650 nm or less, 600 nm or less, 550 nm or less, about 500 nm or less, about 450 nm or less, or about 400 nm or less. Thus, the alpha alumina can have an average particle size bounded by any two of the above endpoints. For example, the alpha alumina can have an average particle size of about 100 nm to about 800 nm, about 150 nm to about 800 nm, about 150 nm to about 500 nm, about 150 nm to about 400 nm, about 200 nm to about 300 nm, about 400 nm to about 800 nm, about 400 nm to about 700 nm, or about 400 nm to about 600 nm.

The substantially spherical, non-aggregated silica particles can have any suitable average particle size (i.e., average particle diameter). The substantially spherical, non-aggregated silica particles can have an average particle size of about 10 nm or more, e.g., about 15 nm or more, about 20 nm or more, or about 25 nm or more. Alternatively, or in addition, the substantially spherical, non-aggregated silica particles can have an average particle size of about 120 nm or less, e.g., about 110 nm or less, about 100 nm or less, about 90 nm or less, about 80 nm or less, about 70 nm or less, about 60 nm or less, 50 nm or less, or about 40 nm or less. Thus, the substantially spherical, non-aggregated silica particles can have an average particle size bounded by any two of the above endpoints. For example, the substantially spherical, non-aggregated silica particles can have an average particle size of about 10 nm to about 100 nm, about 20 nm to about 100 nm, about 20 nm to about 80 nm, about 20 nm to about 60 nm, or about 20 nm to about 40 nm.

The polishing composition can comprise a mixture of fumed alumina particles, alpha alumina particles, and substantially spherical, non-aggregated silica particles in any suitable ratio. Typically, the polishing composition can contain (a) about 0.01 wt. % or more, e.g., about 0.05 wt. % or more, about 0.1 wt. % or more, or about 0.5 wt. % or more of fumed alumina particles, (b) about 0.05 wt. % or more, e.g., about 0.1 wt. % or more, about 0.2 wt. % or more, about 0.3 wt. % or more, or about 0.5 wt. % or more of alpha alumina particles, and (c) about 0.1 wt. % or more, e.g., about 0.3 wt. % or more, about 0.5 wt. % or more, about 1 wt. % or more, or about 2 wt. % or more of substantially spherical, non-aggregated silica particles. Alternatively, or in addition, the polishing composition can contain (a) about 5 wt. % or less, e.g., about 3 wt. % or less, about 1 wt. % or less, about 0.8 wt. % or less, about 0.7 wt. % or less, or about 0.5 wt. % or less of fumed alumina particles, (b) about 5 wt. % or less, e.g., about 3 wt. % or less, about 1 wt. % or less, or about 0.5 wt. % or less of alpha alumina particles, and (c) about 8 wt. % or less, e.g., about 5 wt. % or less, or about 1 wt. % or less of substantially spherical, non-aggregated silica particles. Thus, the polishing composition can comprise a mixture of fumed alumina particles, alpha alumina particles, and substantially spherical, non-aggregated silica particles in amounts bounded by any two of the above endpoints recited for each of fumed alumina particles, alpha alumina particles, and substantially spherical, non-aggregated silica particles. For example the polishing composition can comprise (a) about 0.01 wt. % to about 5 wt. %, 0.1 wt. % to about 3 wt. %, or about 0.5 wt. % to about 3 wt. % of fumed alumina particles, (b) about 0.05 wt. % to about 5 wt. %, about 0.1 wt. % to about 3 wt. %, or about 0.1 wt. % to about 1 wt. % of alpha alumina particles, and (c) about 0.1 wt. % to about 8 wt. %, about 0.5 wt. % to about 5 wt. %, or about 0.5 wt. % to about 1 wt. % of substantially spherical, non-aggregated silica particles.

The abrasive particles preferably are colloidally stable. The term colloid refers to the suspension of abrasive particles in the liquid carrier. Colloidal stability refers to the maintenance of that suspension through time. In the context of this invention, an abrasive is considered colloidally stable if, when the abrasive is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leq 0.5$). More preferably, the value of $[B]-[T]/[C]$ is less than or equal to 0.3, and most preferably is less than or equal to 0.1.

The polishing composition comprises an oxidizing agent that oxidizes nickel-phosphorous. In one embodiment of the polishing composition, the oxidizing agent comprises, consists essentially of, or consists of hydrogen peroxide. In another embodiment, the oxidizing agent comprises, consists essentially of, or consists of hydrogen peroxide, oxone, and sodium persulfate ("SPS"). Without wishing to be bound by any particular theory, it is believed that the combination of hydrogen peroxide, potassium hydrogen peroxymonosulfate sulfate (OXONE®), and sodium persulfate has synergistic attributes which minimize microwaviness and edge roll-off in a polished disk, without sacrificing the removal rate of the memory or rigid disk during polishing. The oxidizing agent preferably comprises about 10 wt. % or less (e.g., about 8 wt. % or less, about 6 wt. % or less, about 4 wt. % or less, or about 2 wt. % or less) of the polishing composition. For example the polishing composition can comprise about 0.05 wt. % to about 10 wt. %, about 0.1 wt. % to about 3 wt. %, or about 0.5 wt % to about 2 wt. % of the oxidizing agent. When the oxidizing agent comprises, consists essentially of, or consists of hydrogen peroxide, OXONE®, and sodium persulfate, the polishing composition comprises (a) about 0.01 wt. % to about 1 wt. %, 0.05 wt. % to about 0.3 wt. %, or about 0.1 wt. % to about 0.5 wt. % of hydrogen peroxide, (b) about 0.05 wt. % to about 3 wt. %, about 0.1 wt. % to about 1 wt. %, or about 0.1 wt. % to about 0.5 wt. % of OXONE®, and (c) about 0.1 wt. % to about 5 wt. %, about 0.5 wt. % to about 3 wt. %, or about 0.5 wt. % to about 1 wt. % of sodium persulfate. The relative amounts (on a weight basis) of hydrogen peroxide: OXONE®:sodium persulfate in the polishing composition preferably are (a) about 15% to about 45%, 20 wt. % to about 40%, or about 25% to about 35% of hydrogen peroxide, (b) about 1% to about 25%, about 5% to about 20%, or about 8% to about 15% of OXONE®, and (c) about 40% to about 90%, about 50% to about 70%, or about 55% to about 65% of sodium persulfate.

The polishing composition further comprises a complexing agent. Complexing agents affect the dispersion of the particles in the polishing composition, and thus influence the removal rate, microwaviness, and edge roll-off of a substrate polished with the polishing composition. In one embodiment of the polishing composition, the complexing agent comprises, consists essentially of, or consists of an iminocarboxylic acid. Preferably, the iminocarboxylic acid is tetrasodium hydroxyl iminodisuccinate ("HIDS"). Without wishing to be bound by any particular theory, it is believed that HIDS forms soft, reversible particle agglomerates which reduce the rate of particle diffusion towards the edge of the disk during polishing, thereby reducing mechanical abrasion at the edge of disk and thus decreasing edge roll-off. In another embodiment, the complexing agent comprises, consists essentially of, or consists of an amino acid. Preferably, the amino acid is glycine. Without wishing to be bound by any particular theory, it is believed that the use of glycine in the polishing composition results in improved microwaviness of the disk. The polishing composition comprises about 0.01 wt. % or more, e.g., about 0.05 wt. % or more, about 0.1 wt. % or more, about 0.5 wt. % or more, or about 1 wt. % or more complexing agent. Alternatively, or in addition, the polishing composition can contain about 10 wt. % or less, e.g., about 8 wt. % or less, about 5 wt. % or less, about 3 wt. % or less, or about 1 wt. % or less complexing agent. Thus, the polishing composition can comprise an amount of complexing agent abounded by any two of the above endpoints. For example, the polishing composition can contain about 0.01 wt. % to about 10 wt. %, about 0.05 wt. % to about 8 wt. %, about 0.1 wt. % to about 5 wt. %, or about 0.5 wt. % to about 3 wt. % of complexing agent.

The polishing composition optionally further comprises a biocide. The biocide can be any suitable biocide, for example, an isothiazolinone biocide. The amount of biocide used in the polishing composition typically is about 1 ppm to about 500 ppm, and preferably is about 10 ppm to about 200 ppm.

The polishing composition can have any suitable pH. The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be nitric acid, sodium hydroxide, potassium hydroxide, ammonium hydroxide, or a combination thereof. The pH buffering agent can be any suitable buffering agent, for example, phosphates, sulfates, acetates, borates, ammonium salts, and the like. The polishing composition can comprise any suitable amount of a pH adjustor and/or a pH buffering agent.

The polishing composition optionally comprises a nonionic surfactant. The purpose of the nonionic surfactant is to reduce the amount of edge polishing observed in the polishing of metal surfaces and to enhance the removal rate of the metal surface. In the polishing of metal surfaces, typically the edges experience higher downforce from a polishing tool. Because abrasion is in part a function of the pressure applied to the surface, the metal edges experience a faster rate of metal erosion relative to the rest of the surface. The result of such uneven polishing of the metal surface results in edge erosion, which is known in the art as roll-off, rub-off, or dub-off. Without wishing to be bound by any particular theory, it is believed that the nonionic surfactant is adsorbed onto the metal surface, thus forming a lubricating film which preferentially reduces removal rate at the edge(s) of the substrate.

The nonionic surfactant can be any suitable nonionic surfactant. Suitable nonionic surfactants include copolymer surfactants comprising siloxane units, ethylene oxide units, and/or propylene oxide units which can have a linear, pendant, or trisiloxane structure. Non-limiting examples of suitable nonionic surfactants include alkylphenol ethoxylates (e.g., nonylphenol ethoxylates), alcohol ethoxylates, siloxane ethoxylates, and the like. Examples of preferred nonionic surfactants include nonylphenol ethoxylates such as the Tergitol NP series available from Dow Corning (Midland, Mich.) and siloxane ethoxylates such as the Silwet series available from General Electric (Schenectady, N.Y.). The polishing composition can contain about 1 ppm or more, e.g., about 5 ppm or more, about 10 ppm or more, or about 20 ppm or more of the nonionic surfactant. Alternatively, or in addition, the polishing composition can contain about 250 ppm or less, e.g., about 200 ppm or less, about 150 ppm or less, about 100 ppm or less, or about 50 ppm or less of the nonionic surfactant. Thus, the polishing composition can contain an amount of nonionic surfactant bounded by any two of the above endpoints. For example, the polishing composition can contain about 1 ppm to about 250 ppm, about 10 ppm to about 200 ppm, or about 20 ppm to about 100 ppm of the nonionic surfactant.

In an embodiment, the polishing composition consists essentially of or consists of fumed alumina particles, alpha alumina particles, substantially spherical, non-aggregated silica particles, hydrogen peroxide, an iminocarboxylic acid, a nonionic surfactant, and water. In another embodiment, the polishing composition consists essentially of or consists of fumed alumina particles, alpha alumina particles, substantially spherical, non-aggregated silica particles, an oxidizing agent consisting of hydrogen peroxide, OXONE®, and sodium persulfate, a complexing agent, a nonionic surfactant, and water. The amounts of fumed alumina, alpha alumina, substantially spherical, non-aggregated silica particles, oxidizing agent, nonionic surfactant, and complexing agent can be as recited herein.

Desirably, the inventive polishing composition maintains or reduces microwaviness, and maintains or reduces edge roll-off, while maintaining or increasing removal rate of the memory or rigid disk, thus improving overall polishing performance of the composition.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., fumed alumina, alpha alumina, substantially spherical, non-aggregated silica particles, an oxidizing agent that oxidizes nickel-phosphorous, a complexing agent, etc.) as well as any combination of ingredients (e.g., fumed alumina, alpha alumina, substantially spherical, non-aggregated silica particles, an oxidizing agent that oxidizes nickel-phosphorous, a complexing agent, etc.).

For example, the fumed alumina, alpha alumina, and substantially spherical, non-aggregated silica particles can be dispersed in water. Any additional components can then be added, and mixed by any method that is capable of incorporating the components into the polishing composition. The oxidizing agent that oxidizes nickel-phosphorous can be added at any time during the preparation of the polishing composition. The polishing composition can be prepared prior to use, with one or more components, such as the oxidizing agent that oxidizes nickel-phosphorous, added to the polishing composition just before use (e.g., within about 1 minute before use, or within about 1 hour before use, or within about 7 days before use). The polishing composition also can be prepared by mixing the components at the surface of the substrate during the polishing operation.

The polishing composition can be supplied as a one-package system comprising fumed alumina, alpha alumina, and substantially spherical, non-aggregated silica particles, an oxidizing agent that oxidizes nickel-phosphorous, a complexing agent, and water. Alternatively, the fumed alumina, alpha alumina, and substantially spherical, non-aggregated silica particles can be supplied as a dispersion in water in a first container, and the complexing agent and optional biocide can be supplied in a second container, either in dry form, or as a solution or dispersion in water. The oxidizing agent that oxidizes nickel-phosphorous desirably is supplied separately from the other components of the polishing composition and is combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use). The components in the first or second container can be in dry form while the components in the other container can be in the form of an aqueous dispersion. Moreover, it is suitable for the components in the first and second containers to have different pH values, or alternatively to have substantially similar, or even equal, pH values. Other two-container, or three or more-container, combinations of the components of the polishing composition are within the knowledge of one of ordinary skill in the art.

The polishing composition of the invention also can be provided as a concentrate which is intended to be diluted with an appropriate amount of water prior to use. In such an embodiment, the polishing composition concentrate can comprise the fumed alumina, alpha alumina, substantially spherical, non-aggregated silica particles, a complexing agent, and water, with or without the oxidizing agent that oxidizes nickel-phosphorous, in amounts such that, upon dilution of the concentrate with an appropriate amount of water, and the oxidizing agent that oxidizes nickel-phosphorous if not already present in an appropriate amount, each component of the polishing composition will be present in the polishing composition in an amount within the appropriate range recited above for each component. For example, the fumed alumina, alpha alumina, substantially spherical, non-aggregated silica particles, and complexing agent can each be present in the concentration in an amount that is about 2 times (e.g., about 3 times, about 4 times, or about 5 times) greater than the concentration recited above for each component so that, when the concentrate is diluted with an equal volume of water (e.g., 2 equal volumes of water, 3 equal volumes of water, or 4 equal volumes of water, respectively), along with the oxidizing agent that oxidizes nickel-phosphorous in a suitable amount, each component will be present in the polishing composition in an amount within the ranges set forth above for each component. Furthermore, as will be understood by those of ordinary skill in the art, the concentrate can contain an appropriate fraction of the water present in the final polishing composition in order to ensure that other components are at least partially or fully dissolved in the concentrate.

The invention also provides a method of chemically-mechanically polishing a substrate with the polishing composition described herein. In particular, the inventive method comprises (i) contacting a substrate with a polishing pad and the chemical-mechanical polishing composition described herein, (ii) moving the polishing pad relative to the substrate with the chemical-mechanical polishing composition therebetween, and (iii) abrading at least a portion of the substrate to polish the substrate.

The substrate to be polished using the method of the invention can be any suitable substrate that contains nickel-phosphorous. A preferred substrate comprises at least one layer comprising nickel-phosphorous. Particularly suitable substrates include, but are not limited to, memory or rigid disks, such as aluminum disks coated with nickel-phosphorous.

The polishing method of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

A chemical-mechanical polishing process can be characterized in a number of ways, such as in terms of the removal rate of a substrate, the resulting microwaviness of a substrate, and the resulting edge roll-off of a substrate.

The removal rate of a substrate can be determined using any suitable technique. Examples of suitable techniques for determining the removal rate of a substrate include weighing the substrate before and after use of the inventive polishing method to determine the amount of substrate removed per unit of polishing time, which can be correlated with the removal rate in terms of thickness of substrate removed per unit of polishing time, and determining the thickness of the substrate before and after use of the inventive polishing method to directly measure the removal rate in terms of thickness of the substrate per unit of polishing time.

Microwaviness of a substrate can be determined using any suitable technique. Examples of suitable techniques for determining the microwaviness of a substrate include optical methods such as incidence interferometry, using instruments available from, for example, Zygo Corp. (Middlefield, Conn.).

As previously discussed herein, roll-off refers to a deviation in planarity of a substrate, such as a nickel-phosphorous coated aluminum memory disk, caused by the increased removal rate of the substrate at the edge of the substrate, where the substrate experiences greater downforce than the remainder of the substrate. As a result, the outermost section of a substrate, such as a memory disk, exhibits a curvature. Determination of the extent of roll-off can be performed by measuring the curvature of the substrate (e.g., memory disk) with a technique such as interferometry. Instrumentation useful in determining roll-off is commercially available from vendors including Zygo Corp. (Middlefield, Conn.) and Veeco Instruments (Plainfield, N.Y.). In the examples below, edge roll-off is expressed as extreme radius of curvature. Before polishing, the substrates have a high positive radius of curvature. The polishing process reduces the high positive radius of curvature of the substrates to lower positive values, zero or to a negative radius of curvature, depending on the edge polishing efficiency of the polishing composition used to polish the substrate. A substrate having a more positive radius of curvature after polishing indicates that the polishing composition has a better edge polishing efficiency and is less likely to result in edge roll-off.

The following examples further illustrate the invention but, of course, should not be construed as in any way limiting its scope.

Example 1

This example demonstrates the effect of tetrasodium hydroxyl iminodisuccinate (HIDS) on the substrate removal rate, edge roll-off, and microwaviness achievable by the inventive polishing composition containing hydrogen peroxide as an oxidizing agent in the polishing of separate substrates comprising nickel-phosphorous-coated aluminum memory disks.

Four separate substrates comprising nickel-phosphorous-coated aluminum memory disks were separately polished on both sides with four different polishing compositions. Polishing Composition 1A contained 0.175 wt. % fumed alumina, 0.7 wt. % of alpha alumina, 2.25 wt. % of substantially spherical, non-aggregated silica, 0.8 wt. % tartaric acid, 108 ppm nonionic surfactant, and 1.2 wt. % of hydrogen peroxide. Polishing Compositions 1B-1D each contained 0.2 wt. % fumed alumina, 0.8 wt. % of alpha alumina, 3 wt. % of substantially spherical, non-aggregated silica, 144 ppm nonionic surfactant, 1.2 wt. % hydrogen peroxide, and HIDS in the amounts indicated below in Table 1.

After polishing, the removal rate, extreme radius of curvature, and microwaviness of each substrate were determined, and the results are summarized in Table 1.

TABLE 1

| Polishing Comp. | HIDS (wt. %) | Removal Rate (mg/min) | Radius of Curvature Side A (nm) | Radius of Curvature Side B (nm) | Microwaviness (Å) |
| --- | --- | --- | --- | --- | --- |
| 1A | 0 | 35.3 | −3.2 | −0.2 | 2.9 |
| 1B | 0.8 | 36.3 | −7.4 | −1.2 | 2.4 |
| 1C | 1.6 | 40.2 | −2.1 | 1.5 | 2.44 |
| 1D | 2.4 | 38.9 | 0.3 | 2.9 | 2.49 |

As is apparent from the results set forth in Table 1, Polishing Compositions 1B-1D, which contained various concentrations of HIDS, exhibited a nickel-phosphorous removal rate equivalent to or better than that of Polishing Composition 1A, which did not contain HIDS. The compositions containing HIDS also exhibited a reduction in microwaviness of the nickel-phosphorous substrate. In addition, the polishing compositions containing HIDS exhibited a more positive radius of curvature, indicating that the compositions have an improved edge polishing efficiency and are thus less likely to result in edge roll-off.

Example 2

This example demonstrates the effect of various oxidizing agents and combinations thereof on the substrate removal rate, edge roll-off, and microwaviness achievable by the inventive polishing composition containing glycine as a complexing agent in the polishing of substrates comprising nickel-phosphorous-coated aluminum memory disks.

Nineteen separate substrates comprising nickel-phosphorous-coated aluminum memory disks were separately polished on both sides with different polishing compositions. Polishing Composition 2A contained 0.175 wt. % fumed alumina with an average particle size of 120 nm, 0.7 wt. % of alpha alumina with an average particle size of 500 nm, 2.25 wt. % of silica with an average particle size of 32 nm, 0.8 wt. % tartaric acid, 108 ppm nonionic surfactant, and 1.2 wt. % of hydrogen peroxide. Polishing Compositions 2B-2S each contained 0.2 wt. % fumed alumina with an average particle size of 120 nm, 0.8 wt. % of alpha alumina with an average particle size of 500 nm, 3 wt. % of silica with an average particle size of 32 nm, 144 ppm nonionic surfactant, 1.2 wt. % glycine, and an oxidizing agent(s) in the amounts indicated below in Table 2.

After polishing, the removal rate, extreme radius of curvature (sides A and B), and microwaviness of each substrate were determined, and the results are summarized in Table 2.

TABLE 2

| Polishing Comp. | Total Oxidizing Agent (wt. %) | $H_2O_2$ (wt. %) | OXONE (wt. %) | SPS (wt. %) | Removal Rate (mg/min) | Radius of Curv. Side A (nm) | Radius of Curv. Side B (nm) | Micro-waviness (Å) |
|---|---|---|---|---|---|---|---|---|
| 2A | 1.2 | 1.2 | 0 | 0 | 32.7 | −3.9 | −0.3 | 2.89 |
| 2B | 0.5 | 0.5 | 0 | 0 | 24.8 | −13.3 | −9.7 | 2.56 |
| 2C | | 0 | 0 | 0.5 | 20.6 | 4.1 | 4.8 | 2.96 |
| 2D | | 0.15 | 0.35 | 0 | 25.4 | −4.2 | −0.3 | 2.21 |
| 2E | | 0.25 | 0 | 0.25 | 30.1 | −10.1 | −7.5 | 2.96 |
| 2F | | 0.105 | 0.245 | 0.15 | 22.6 | −3.9 | −0.4 | 2.12 |
| 2G | | 0.06 | 0.14 | 0.3 | 24.2 | −0.1 | 3.7 | 2.6 |
| 2H | 1.2 | 1.2 | 0 | 0 | 27.2 | −13.5 | −12 | 2.95 |
| 2I | | 0 | 0 | 1.2 | 25.7 | −2.4 | 0.9 | 2.57 |
| 2J | | 0.36 | 0.84 | 0 | 35 | −8.4 | −3.4 | 2.1 |
| 2K | | 0.6 | 0 | 0.6 | 33 | −10.5 | −7.1 | 2.68 |
| 2L | | 0.252 | 0.588 | 0.36 | 32.4 | −3.5 | 2.3 | 2.25 |
| 2M | | 0.144 | 0.336 | 0.72 | 31.1 | −3 | 1.2 | 2.22 |
| 2N | 1.9 | 1.9 | 0 | 0 | 28.2 | −10.1 | −11.8 | 2.72 |
| 2O | | 0 | 0 | 1.9 | 31.7 | −2.2 | 0.6 | 2.5 |
| 2P | | 0.57 | 1.33 | 0 | 39.6 | −5.7 | −1.8 | 2.37 |
| 2Q | | 0.95 | 0 | 0.95 | 37.8 | −13.3 | −10.9 | 2.61 |
| 2R | | 0.399 | 0.931 | 0.57 | 35.6 | −3.4 | 0.8 | 2.34 |
| 2S | | 0.228 | 0.532 | 1.14 | 32.5 | −3.2 | 1.6 | 2.19 |

As is apparent from the results set forth in Table 2, Polishing Compositions 2F, 2G, 2L, 2M, 2R, and 2S, which contained hydrogen peroxide, OXONE®, and sodium persulfate, resulted in the best balance of removal rate, microwaviness, and edge roll-off of the substrate, as compared to the remaining polishing compositions, which contained only one or two of these same oxidizing agents. Polishing Compositions 2G, 2M, and 2S, each of which contained the three oxidizing agents in a ratio of 12% $H_2O_2$, 28% OXONE®, and 60% SPS, were particularly effective.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of chemically-mechanically polishing a nickel-phosphorous-coated aluminum substrate comprising:
   (i) contacting a substrate with a polishing pad and a chemical-mechanical polishing composition comprising:
      (a) fumed alumina particles,
      (b) alpha alumina particles,
      (c) substantially spherical, non-aggregated silica particles,
      (d) about 10 ppm to about 200 ppm nonionic surfactant
      (d) an oxidizing agent comprising 0.05 wt. % to about 0.3 wt. % of hydrogen peroxide, about 0.1 wt. % to about 0.5 wt. % potassium hydrogen peroxymonosulfate sulfate, and about 0.5 wt. % to about 1 wt. % sodium persulfate,
(e) a complexing agent, and
(f) water,
(ii) moving the polishing pad relative to the substrate with the chemical-mechanical polishing composition there between, and
(iii) abrading at least a portion of the substrate to polish the substrate, wherein the microwaviness and edge roll-off in the polished substrate is improved compared to substrates polished with identical polishing compositions, but having only one or two of the oxidizing agents.

2. The method of claim 1, wherein the polishing composition comprises about 0.1 wt. % to about 3 wt. % of fumed alumina particles, about 0.1 wt. % to about 1 wt. % of alpha alumina particles, and about 0.5 wt. % to about 5 wt. % of substantially spherical, non-aggregated silica particles.

3. The polishing composition of claim 1, wherein the non-ionic surfactant is a copolymer surfactant comprising siloxane units, ethylene oxide units, and propylene oxide units.

4. The method of claim 1, wherein the polishing composition comprises about 0.1 wt. % to about 5 wt. % complexing agent.

5. The method of claim 1, wherein the complexing agent is an amino acid.

6. The method of claim 1, wherein the complexing agent is glycine.

7. The method of claim 1, wherein the substrate comprises a nickel-phosphorous-coated aluminum disk.

8. The method of claim 7, wherein the disk is a memory disk.

* * * * *